United States Patent [19]

Szucs et al.

[11] Patent Number: 4,954,030

[45] Date of Patent: Sep. 4, 1990

[54] LOAD HAULER

[76] Inventors: Robert M. Szucs, 2585 Dodge Rd., East Amherst, N.Y. 14051; Roy L. Bright, 5038 Tonawanda Creek Rd., North Tonawanda, N.Y. 14120

[21] Appl. No.: 343,285

[22] Filed: Apr. 26, 1989

[51] Int. Cl.$^5$ .............................................. B65D 63/00
[52] U.S. Cl. ..................................... 410/96; 410/100; 410/103
[58] Field of Search .............................. 410/32, 34–42, 410/96, 97, 99, 100, 103, 104, 120, 12

[56] References Cited

U.S. PATENT DOCUMENTS 4,369,009 1/1983 Fulford .......................... 410/100 X Primary Examiner—Joseph F. Peters, Jr.
Assistant Examiner—Virna Lissi Mojich
Attorney, Agent, or Firm—James J. Ralabate

[57] ABSTRACT

This is a device to be used on motor vehicles to haul various loads. The device has a stabilizer bar with fixed or adjustable pins called isolator pins. These pins are located at various positions along the stabilizer bar to provide a tie down point for the load to be hauled. A strap can then be woven through the desired isolator pins to firmly hold down the load. The stabilizer bar has at one of its terminal ends a securing means for the strap, and at the opposite terminal end of the stabilizer bar is a tension device such as a ratchet which tightens the strap after it is wound around the load.

4 Claims, 6 Drawing Sheets

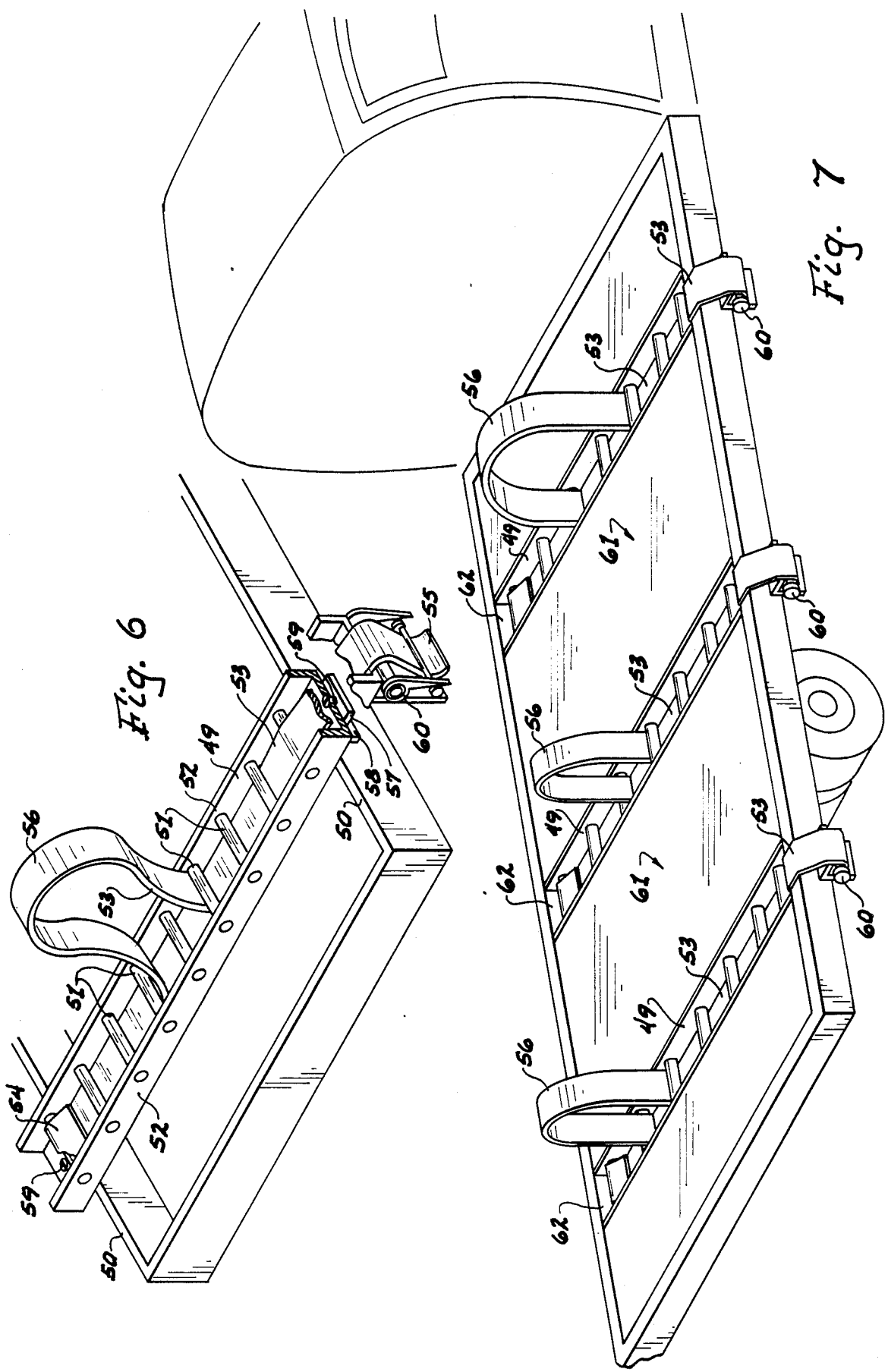

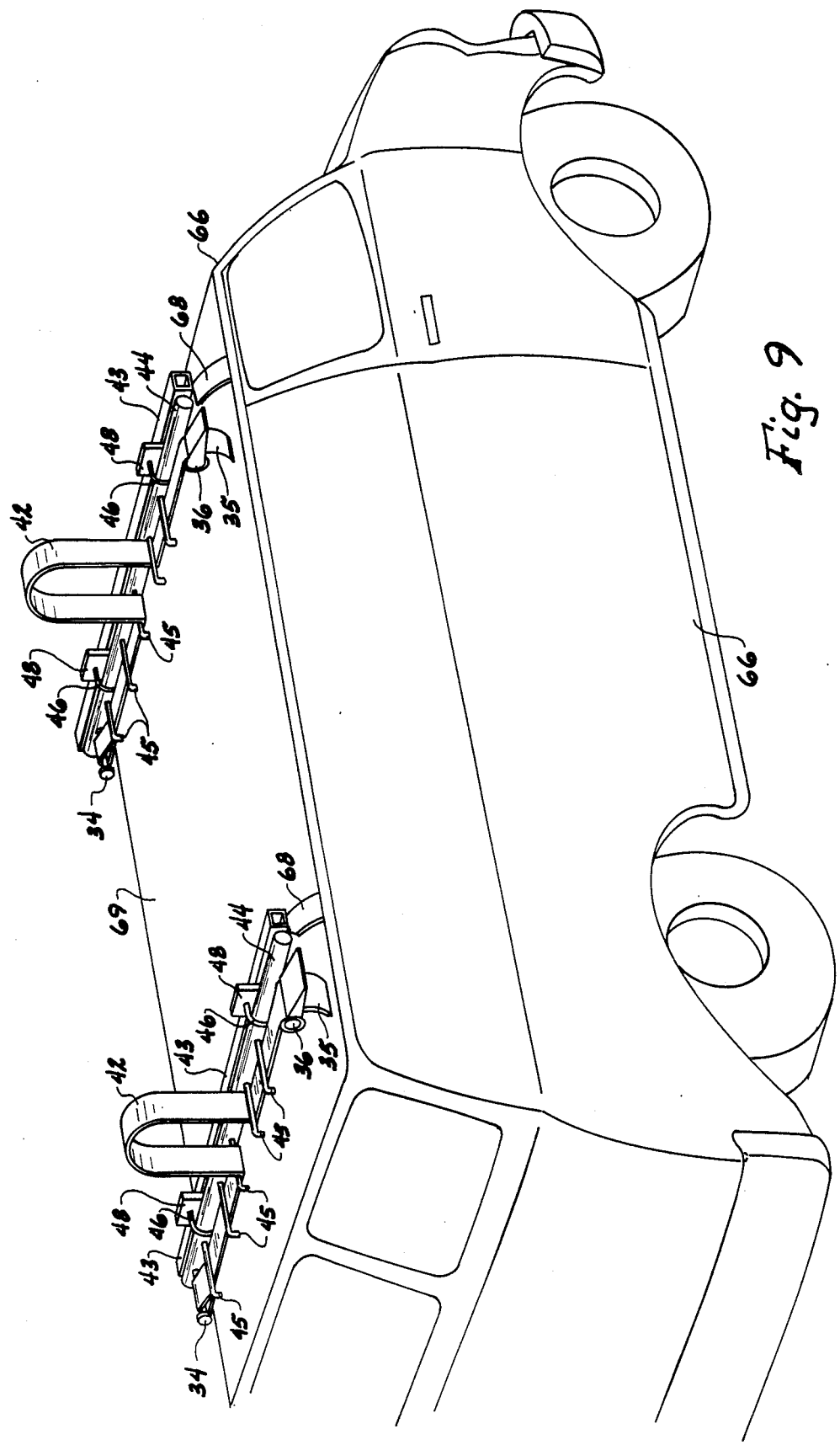

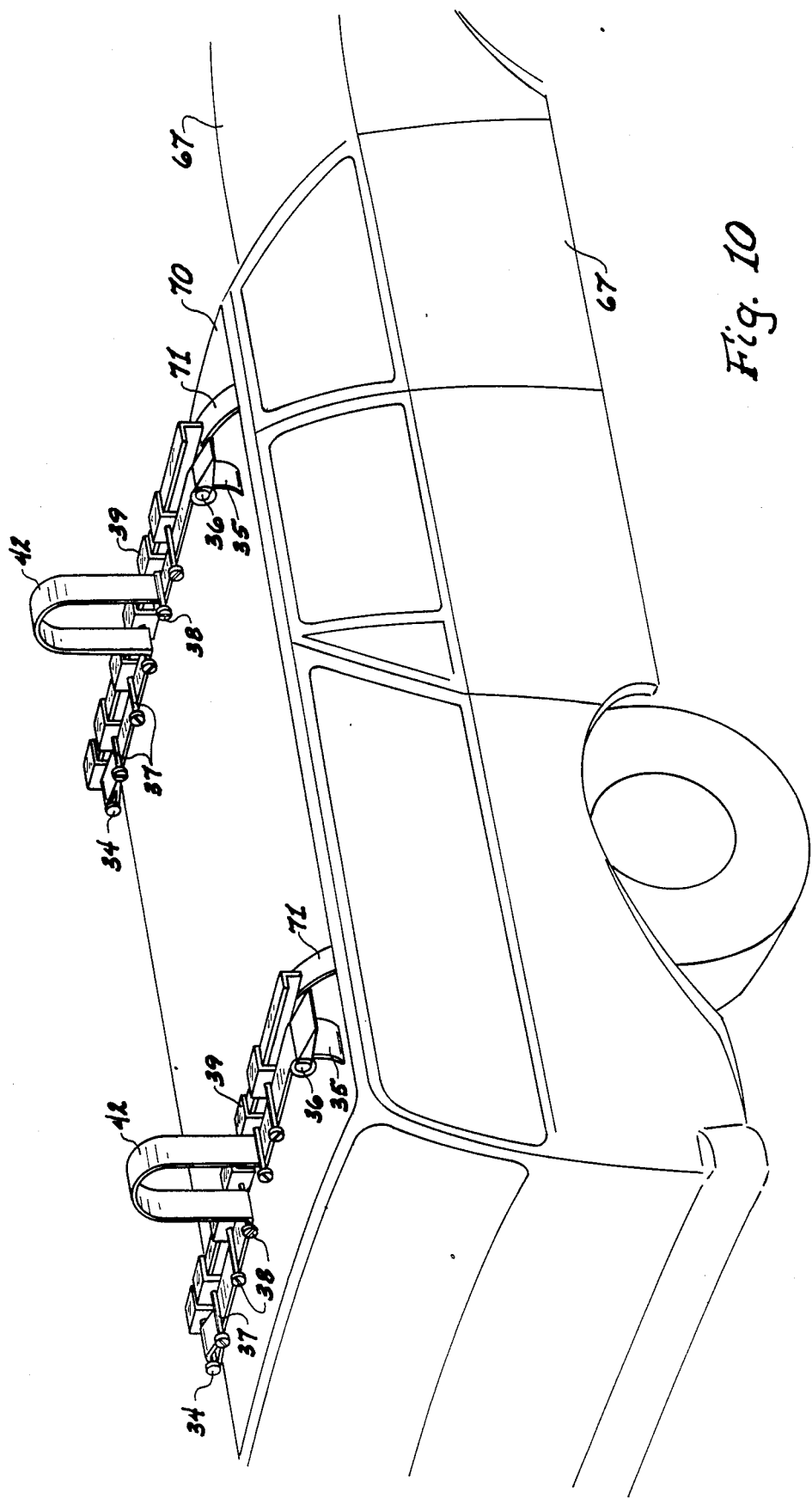

LOAD HAULER

This invention relates to a load hauler and, more specifically, to a novel hauler for securing loads or cargo to a platform on a motor vehicle or trailer.

BACKGROUND OF THE INVENTION

It has been observed that one of the greatest problems confronting the hauler of materials of any type is how to isolate and secure the load safely to a vehicle platform whether it be a pickup truck rack, a car top carrier, a flat bed truck or a semi-trailer. The problem is not one of devices to hold down a load using binders for which there are numerous rachets and winches available in the market place. The problem is one of attaching the binder to the vehicle loading platform such that its positioning is advantageous to safely secure the load irrespective of configuration and prevent it from shifting. The present invention provides for a system to attach the strap or binder at one or many points along the plane of the vehicle loading platform or loading surface and in combination with a tension device safely secure the load to the vehicle.

There are known in the art various motor vehicle or trailer hauling devices for carrying loads from one location to another. Each of these devices provides means for securing the load onto the hauling assembly. Some of these hauling devices are disclosed in U.S. Pat. Nos. 2,665,938; 3,152,709; 4,000,924; 4,043,275; 4,163,425; 4,382,736; 4,405,170; 4,423,899; 4,444,427; 4,509,787 and 4,770,458. In Pat. Nos. 2,665,938 and 3,152,709 a removable loading hauling device is disclosed; however, load-securing means are not suggested. Pat. No. 4,000,924 also discloses demountable equipment for supporting exceptionally heavy loads but, again, does not disclose specific securing means to be used. In Pat. No. 4,043,275 a chain hold down means is disclosed for securing a heavy cargo to a truck or railroad car. The chain adjusting means and its locking structure allows lashing chains of equal lengths to be employed for all sizes of cargo. There is, however, no accommodation in No. 4,043,275 for holding down various shaped loads that are loaded in a parallel fashion on a horizontal or vertical surface. In U.S. Pat. No. 4,163,425 a load-anchoring system for a flatbed is disclosed. The securing system of this patent involves a technique which incorporates a fixed beam on the bed of the vertical with four locking assemblies one at each corner. The locking assemblies of this prior art patent include levers and springs which are somewhat complex. In U.S. Pat. No. 4,382,736 a load apparatus is shown for a vehicle utilizing a belt winch for tightening the binder or straps holding the load. There is, however, no disclosure in this prior art patent for accommodating loads of various configurations at the same time. None of the other prior art patents cited above provide for securing means that prevent the load from shifting irrespective of the configurations of the load.

SUMMARY OF THE INVENTION

It is therefore an object of this invention to provide a load hauler devoid of the above-noted disadvantages.

Another object of this invention is to provide a load hauler that can be used on a wide variety of motor vehicles or trailers.

A further object of this invention is to provide a relatively uncomplicated device for hauling loads of various configurations.

Another object of this invention is to provide a load hauler that is easy to use and yet very effective in preventing shifting of loads irrespective of configuration.

A still further object of this invention is to provide a load hauler that improves the safety considerations when a load is being moved from one location to another.

A yet further object is to provide a load hauler that is extremely versatile and can be used with a variety of loads having different geometric forms.

These and other objects are accomplished in accordance with this invention generally speaking by providing a novel load hauler. This novel load hauler utilizes a stabilizer bar with fixed or adjustable pins called isolator pins. These pins can be located at various positions along the stabilizer bar and provide a tie down point for the load to be hauled. A strap or other binder means can then be woven through the desired isolator pins to firmly secure the load in position on the loading rack. This structure provides a load hauler for isolating and safely securing one or more separate geometric loads to a vehicle platform when transporting cargo, material, tools, equipment or any other load. Incorporated in this structure together with the stabilizer bar and isolator pins is a binder and tension device to provide a complete system to safely secure a load to the vehicle. The structure of the present invention is adaptable for use on the rack of a pickup truck, on a flatbed truck, semi-trailers, car and station wagon top carriers and any other vehicle used to haul loads. Because of its unique configuration the device of the present invention can be used to carry household items such as lumber, toboggans, skis or commercial loads such as pipes, ducting, hardware, structural steel, pumps, machinery and the like. These items can be intermixed on the same load with equal secure fixing of each by using the present invention. Thus, the novel structure comprising a stabilizer bar, isolator pins, binders and tension devices provide a much more secure means to tie down a load than has previously been used.

The stabilizer bar is made of steel or a strong plastic that will provide a track or holes through which the isolator pins are located. The isolator pins may be permanently fixed in these holes by welding or tightening nuts or they can be movable pins so that they can be randomly located along the peripheral portion of the stabilizer bar. It is important that whatever type isolator pins be used that it be capable of remaining in a fixed position when and after the load is secured down. The stabilizer bar, in addition to providing a housing for the isolator pins, is also used to provide for a rigid structural support for the load to be hauled. The stabilizer bar may be a standard steel "C" channel angle iron or may be square tubing currently available off the counter. Holes may be drilled or punched at regular intervals along the length through two sides of the bar to accommodate insertion of the pins therethrough and also to provide for mounting to brackets on a vehicle. The stabilizer bar has means near each of its terminal end portions for connection and attachment to a support such as vertical load supports, racks or brackets, flatbed surfaces, vehicle rooftops, car roof brackets, truck side walls and the like. Any suitable mounting bracket on the stabilizer bar may be used such as a bracket which will fit over the end of the stabilizer bar and provide a surface for attaching to a support and for attaching to a tension device. For example, one end of the bracket could have a drill hole for accepting a "J" bolt or other type of fastener to attach the stabilizer bar to the vehicle support structure. At one end of the stabilizer bar is fixed one end of a binder such as a strap or rope that is long enough to be eventually wound around the load and woven through the desired isolator pins when securing the load. At the opposite end of the stabilizer bar is a tension device such as a ratchet or winch which accepts and tightens the other end of the binder after it is wound around the load and woven through the isolator pins. The ratchet or winch used are standard, off the shelf items which are easily available. The ratchet or winch will employ a standard synthetic strap, rope or wire cable to act as the binder against the load and securing it to the stabilizer bar. The ratchet or winch is connected to one end of the stabilizer bar. Any suitable ratchet or winch could be used such as the following: (1) ratchet model #50R12SP from Spar Set, 3125 Industrial Drive, Sanford, N.C. 27330, (2) ratchet models #8012802 from Kinedyne Corporation, 151 Industrial Parkway, PO Box 5207, North Branch, N.J. 08876, (3) ratchet model #9571T11 from McMaster-Carr Supply Company, PO Box 440, New Brunswick, N.J. 08903, (4) winch models #9572T11 and 9572T15 from McMaster-Carr Supply Company, PO Box 440, New Brunswick, N.J. 08903 and (5) winch models #1820, 7820, 2820 and 1820P2 from Kinedyne Corporation, 151 Industrial Parkway, PO Box 5207, North Branch, N.J. 08876.

Any type of isolator pins may be used such as those made from steel or other suitable strong material. The pins will vary in size depending on load requirements. One configuration is a straight threaded pin with flat washers welded at intervals along the bar to retain a binder strap or cable. The pins can also be removable if desired so they can be located at any point along the bar. These pins as earlier noted can be welded to the stabilizer bar at selected intervals or may be movable to any suitable selective location along the stabilizer bar then fixed into position by any means including the tension exerted upon the binder strap when the load is secured down and the binder is tightened by the tension device. The pins can also be the type that are removable from the apertures in the stabilizer bar or positioned around the stabilizer bar and located at the desired location in the bar and tightened for example by a wing nut, conventional nut and the like. Any suitable type of hold down means may be used to secure the stabilizer bar device to a vehicle structure. As noted earlier, "J" type bolts threaded at one end may be used or conventional bolt and nut means may also be used. If the load hauler of this invention is to be used on a domestic vehicle such as a car or station wagon, conventional hold down or mounting means may be used that are similar to the hold down means presently used on racks or roof carriers. Many of these roof carriers have braces which fit under a roof drain of a car and attach thereto. The load hauler of the present invention can be used to retrofit on an existing vehicle rack or it can be installed as original equipment. It can be removable from the vehicle or it can be fixed permanently to the vehicle.

One end of the strap or cable is fixed to the end of the stabilizer bar opposite the ratchet or winch. The other end of the strap is loose. When the hauler places a load atop the stabilizer bar he chooses which Isolator Pin setting would best suit the load requirements such as how acute should the binder strap angle be with respect to the load. Next, the strap or cable is woven through the isolator pins around the load and onto the ratchet or winch. Lastly, the hauler tightens the binder strap or cable using the ratchet or winch to the desired tightness.

BRIEF DESCRIPTION OF THE DRAWING

FIG. 6 is a perspective view of a fifth embodiment of the load hauler unit of this invention.

FIG. 7 is a perspective view of a flatbed truck having three-load hauler units of this invention attached thereto.

FIG. 9 is a perspective view of a motor van having two-load hauler units of this invention attached to an existing carrier on the roof of the van.

FIG. 10 is a perspective view of a station wagon (or car) having two load hauler units of this invention attached to the roof of the vehicle.

DETAILED DESCRIPTION OF THE DRAWINGS AND THE PREFERRED EMBODIMENTS

Figure 1:
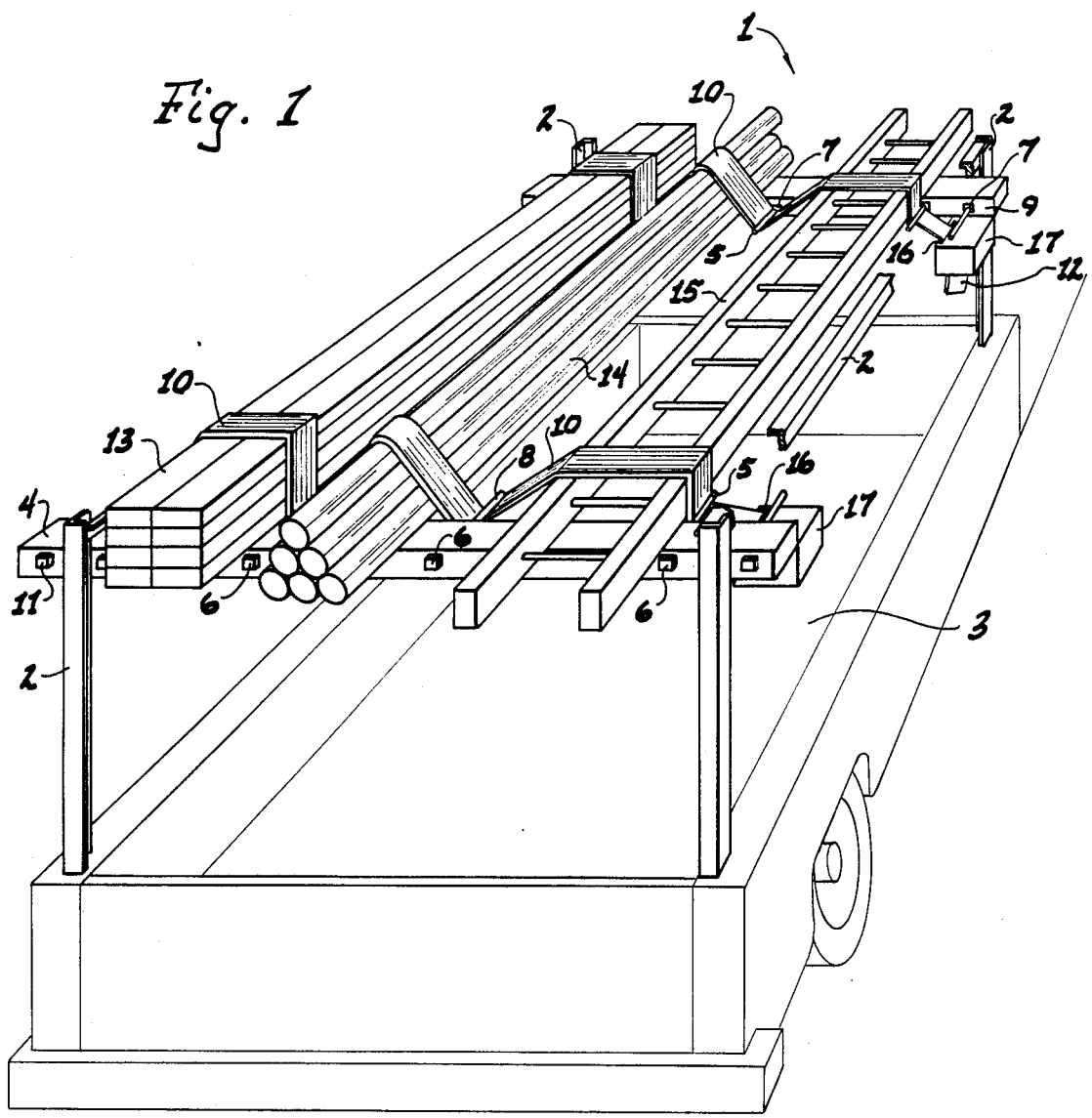
FIG. 1 is a perspective view of a pickup truck having mounted thereto in two locations the load hauler unit of this invention.

In FIG. 1 a pickup truck 1 is shown having four upright supports 2 extending upward from the truck bed 3. Connecting the two right upright supports 2 are horizontal supports 2A and connecting the two left upright supports 2 are horizontal supports 2A (not shown). The stabilizer bars 4 are attached to supports 2, one bar 4 at the front portion of the truck 1 and one bar 4 attached to supports 2 located in the rear portion of the truck 1. Any suitable connecting means such as conventional nuts and bolts, brackets, welding or any other means may be used to connect the stabilizer bars 4 to upright supports 2. Stabilizer bars 4 have holes along two opposite sides thereof through which isolator pins 5 are inserted and fixed. At one end of the threaded isolator pins 5 are bolt heads 6 and on the opposite side of pins 5 may be nuts 7 which are tightened upon pins 5 to fix them in place. Other pin configurations can be used as described in FIGS. 2-6; however, the spaced pin general concept is the same for each. As the pins 5 are located through the holes in bar 4, a portion 8 of pins 5 extend beyond the outer edge 9 of bars 4. An end of strap or binder 10 is fixed to a fixed terminal pin 11 at one end of bar 4 and the other strap end 12 is free to be moved. Strap end 12 is woven around lumber load 13, down and under a pin 5 (this process is repeated on the pipe load 14, ladder load 15) and, finally, through ratchet slot 16 and out ratchet 17. Ratchet or tension device 17 is then tightened to secure the load 13, 14 and 15 in position. This procedure is repeated and followed for the other load hauler device on the truck. It is noted that no matter what the physical form or configuration of the load, the strap 10 fits snugly around it and firmly holds the load securely in position. Even a triangular configuration as that formed by the pile of pipes 14 can easily be secured in place.

Figure 2:
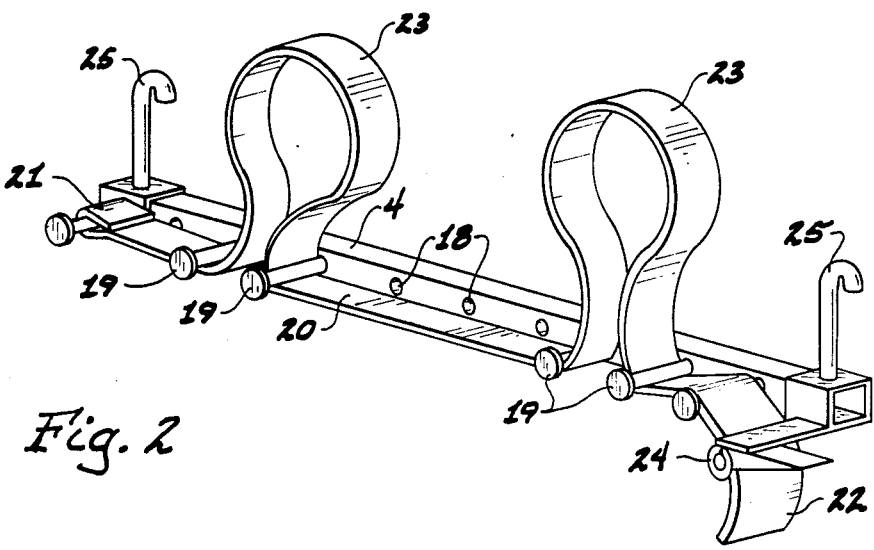
FIG. 2 is a perspective view of one embodiment of the load hauler unit of this invention.

In FIG. 2 a detailed view of a first embodiment of the load hauler unit is illustrated. In this view stabilizer bar 4 has apertures 18 uniformly drilled therethrough so that pins 19 can be selectively inserted therethrough. In this embodiment pins 19 are removable from apertures 18 and can be located wherever needed. A strap 20 is attached at one end to attachment means 21 leaving the opposite free end 22 of strap 20 to be woven through and around pins 19 as required. The loops 23 in the strap 20 would encircle a load (not shown) to be held in position. Strap-free end 22 is then fed into a ratchet 24 and tightened to secure the load in place. By holding the strap 20 firmly around the load it will prevent shifting and movement of the load during the transporting operation. At the terminal ends of bar 4 are support attachment means 25 which are used to connect the stabilizer bars 4 to the supports 2 (as shown in FIG. 1). In this embodiment a "J" screw or bolt 25 is used as the support attachment means to attach the stabilizer 4 to an existing truck rack or support 2. Obviously, other suitable attachment means may be used.

Figure 3:
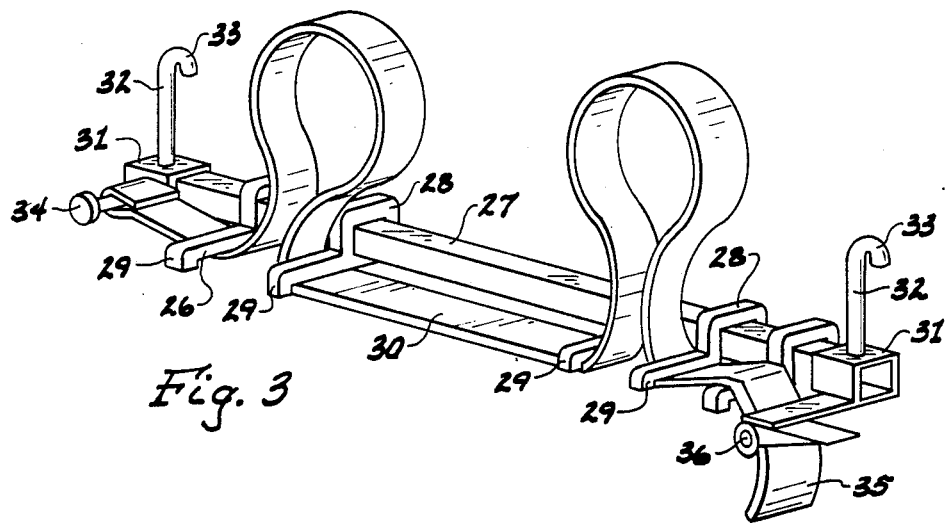
FIG. 3 is a perspective view of a second embodiment of the load hauler unit of this invention.

In FIG. 3 a second embodiment of this invention is illustrated where pins 26 fit around stabilizer bar 27 and are freely movable thereon. A part of pin 26 called the encircle portion 28 loosely fits around and encircles the periphery of bar 27 so to be freely movable from one end of bar 27 to the others. The other part of pin 26, that is the projection part 29, extends outwardly from the bar 27 and provides the pin portion around which strap 30 is wound. Projection part 29 can be a downward bent rod or a headed bolt as long as there is a guide for strap 30 to hold strap 30 on part 29 and prevent it from slipping off the end. A removable support connecting means 31 is shown which fits around bar 27 terminal portions and is used to connect onto vertical supports 2 as shown in FIG. 1. Connecting means 31 has a "J" bolt 32 which bolts through means 31 after connection to a support. The loop or hook part 33 of bolt 32 fits over a support upright iron (as 2) and is then tightened by bolting through means 31. Strap 30 is fixed at one of its ends at strap attachment means 34 leaving strap end 35 free to be wound around and over the load and pin projections 29. Strap end 35 is then inserted into ratchet or winch 36 and tightened thereby to securely tighten the strap 30 around the load. It is important that pins 26 remain stationary after the strap 30 is tightened to prevent movement of the load. Pins having tightening means or pins that fit through apertures are therefore preferred over those that are movable or slidable. However, the movable or slidable pins 26 such as those shown in this figure will be somewhat fixed when tension is exerted thereon by ratchet or winch tightening.

Figure 4:
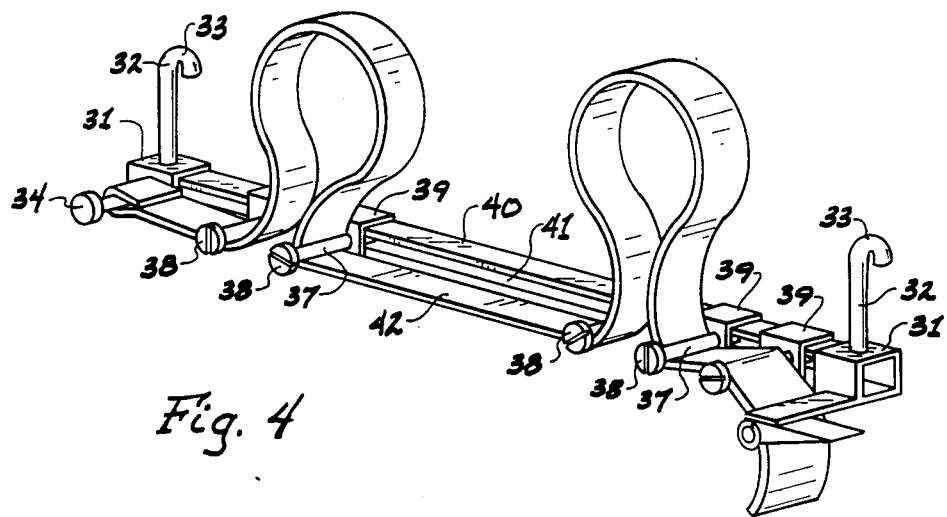
FIG. 4 is a perspective view of a third embodiment of the load hauler unit of this invention.

FIG. 4 illustrates an embodiment of the invention similar to that of FIG. 3 except in FIG. 4 bolt or pins 37 have tightening means 38 which fix them in place when they are positioned in the desired location. In this illustration tightening means 38 are headed bolts which are threaded into movable or slidable enclosure 39. After enclosure 39 is moved to the desired position along bar 40, the headed bolt 38 is screw tightened into enclosure 39 until the other end of the bolt 37 contacts the adjacent side 41 of bar 40 and locks therewith and thereto. This then fixes pin or bolt 37 in position prior to the strap 42 being wound therearound. All other elements in this FIG. 4 are the same as in FIG. 3 and are numbered as in FIG. 3.

Figure 5:
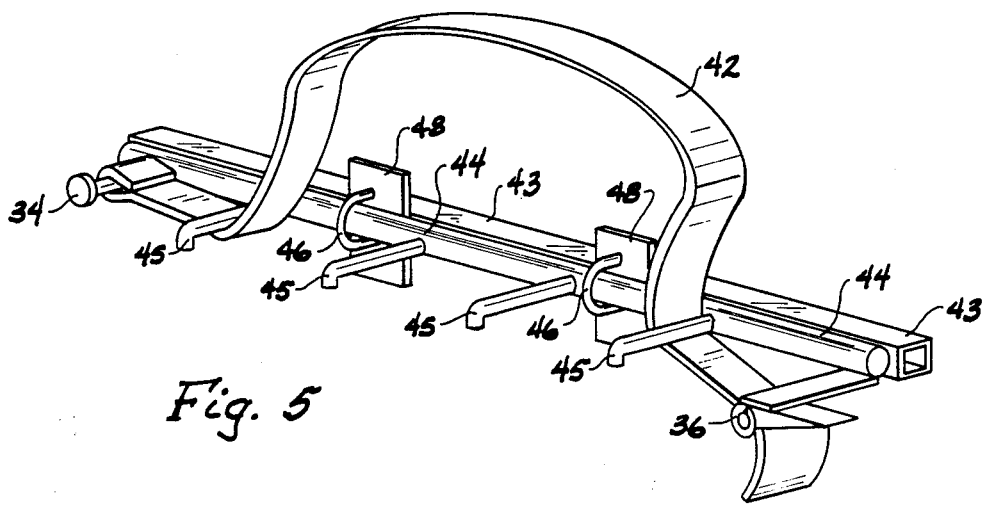
FIG. 5 is a perspective view of a fourth embodiment of the load hauler unit of this invention.

In FIG. 5 a further embodiment of the invention is illustrated. The rectangular-shaped bar 43 depicts an existing carrier rack on a vehicle. This bar 43 could be other shapes such as round pipe or C-channel and support stabilizer bar 44 made of a steel rod running adjacent to 43 and fastened by means of mounting brackets 48 welded to 44 then U-bolted 46 to bar 43. The isolator pins 45 are attached to stabilizer bar 44 and fixed in place by any convenient means such as welding. Stabilizer bar 44 is prevented from lateral or up and down movement by means of 48 welded to 44 and fastened to 43 by means of U bolts 46. Strap 42, strap attachment means 34 and ratchet or winch 36 are as in the description of the other figures.

Figure 8:
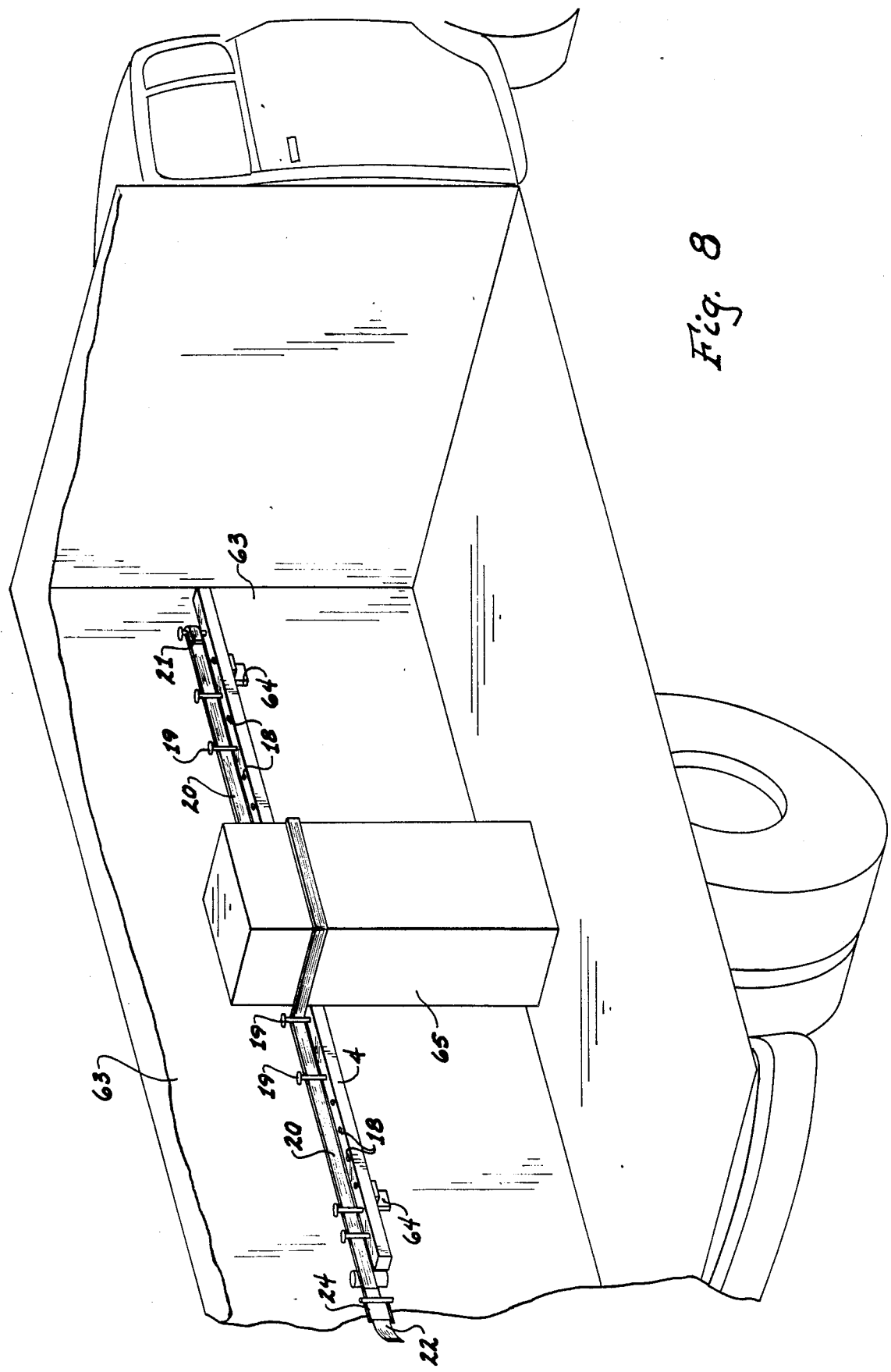
FIG. 8 is a perspective view of a truck having a load hauler unit of this invention attached to the side portion of an upright section of the truck.

In FIG. 6 another embodiment of this invention is shown. The stabilizer bar 49 is made from a section of channel iron and is laid flat on the bed 50 of a truck or trailer. Stabilizer bar 49 in this configuration has the appearance of a ladder structure where pins 51 are as rungs of a ladder. Side rails 52 of bar 49 act as a guide preventing side movement of strap 53 and holding said strap in place. Strap 53 is attached or fixed at one end at strap attachment means 54 allowing the free end 55 to be woven around the load (loops 56) and under and around each selected pin 51 to thereby secure the load in position. Stabilizer bar 49 is attached to a vehicle support or in this case the truck or trailer flatbed 50 by support attachment means 57. Attachment means 57 comprise an L-shaped mounting bracket 58 which is attached to the support structure 50 by any convenient means. Threaded bolt 59 which extends through bar 49 is then tightened and fixed in place by a nut or other means thereby securely attaching bar 49 to support 50. Winch or ratchet tension means 60 is then used to tighten strap 53 around load. FIG. 7 shows the embodiment of FIG. 6 as it is used on a flatbed truck 61 in three locations. While FIG. 7 shows bar 49 recessed in a depression 62 of flatbed truck 61, bar 49 can be placed upon a flat surface without depressions and be just as effective in use. Winch or ratchet 60 is different in FIGS. 6 and 7 to illustrate each has utility in the present invention. In FIG. 6 stabilizer bar 49 depicts attachable unit that can be used when hauling appropriate cargo for this device. In FIG. 7 the stabilizer bar 49 is recessed in a depression to eliminate the need to remove and store the bar when inappropriate for use in hauling a particular cargo. The use of ratchet or winch is dependent on choice of end user or if cargo loads are extremely heavy and require higher tensions on the binder straps 53 and a winch is preferred with possible wire rope as a binder. In FIG. 8 the load hauler means of this invention is shown as it is used on the side panel 63 or portion of a vehicle; in this case a truck but it could be a train side car or the like. Any of the embodiments of this invention shown in the previous figures can be used in this mode with the support attachment means modified to convert to a side or vertical support rather than a level or horizontal support such as a flatbed or the supports shown in FIGS. 1, 6, 7, 9 or 10. This type of hauler unit can be used to secure cargo 65 in an upright position along the vehicle wall 63. Brackets 64 or any other convenient support attachment means can be used to secure stabilizer bar 4 to the side wall 63 of the vehicle. While the embodiment illustrated in FIG. 2 is shown attached to wall 63 any other embodiment of this invention may be used in a side wall attachment.

In FIGS. 9 and 10 the load hauler is shown attached to a van 66 and station wagon 67 respectively. In FIG.

9 the embodiment of FIG. 5 is shown attached by attachment means or clamp 68 to the roof 69 of van 66. In FIG. 10 the embodiment of FIG. 4 is shown attached to the roof 70 of station wagon 67. The attachment means 31 shown in FIG. 4 is modified in figure 10 to a clamp 71 so that it can be secured to a drain or other section of station wagon 67.

The preferred and optimally preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A load hauler device comprising a stabilizer bar, isolator pins, binder means, a tension means, and support securing means, said stabilizer bar being an elongated member having fixed to one end thereof a binder securing means and at an opposite end thereof said tension means, said binder means secured to said binder securing means and extending at a length beyond said opposite end of said stabilizer bar, a plurality of said isolator pins extending outwardly from a side of said stabilizer bar, and wherein said isolator pins have tightening means and have a portion which encircles the side periphery of said stabilizer bar, and an extending portion connected to the portion which encircles, and said extending portion extending beyond the side periphery of said stabilizer bar, said binder means extendable through and beyond a portion of said stabilizer bar containing said pins, said binder capable of entering said tension means and being tightened thereby, said support securing means positioned near terminal end portions of said stabilizer bar and having means to connect said stabilizer bar to a supporting surface on a transporting vehicle.

2. The device of claim 1 wherein said isolator pins are laterally movable along substantially the length of said stabilizer bar and said isolator pins having fixing means to fix in position at a desired point along the length of said stabilizer bar.

3. The device of claim 1 wherein said isolator pins are fixed to a rigid rod, said rigid rod fastened externally to an existing carrier bar and extending through substantially the length of said carrier bar, said isolator pins extending outwardly from said stabilizer bar.

4. The device of claim 1 wherein said tension means is a winch having a slot therein to receive said binder means, said winch being capable of tightening said binder means upon demand.

* * * * *